(12) United States Patent
Ouhadi et al.

(10) Patent No.: US 7,829,623 B2
(45) Date of Patent: Nov. 9, 2010

(54) THERMOPLASTIC VULCANIZATES HAVING IMPROVED FABRICABILITY

(75) Inventors: Trazollah Ouhadi, Liege (BE); Kang-Bo Wang, Copley, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 957 days.

(21) Appl. No.: 11/251,516

(22) Filed: Oct. 14, 2005

(65) Prior Publication Data

US 2006/0100347 A1    May 11, 2006

(51) Int. Cl.
C09B 67/00 (2006.01)
C08K 5/00 (2006.01)
C08L 23/00 (2006.01)

(52) U.S. Cl. .................. 524/502; 524/515; 525/240
(58) Field of Classification Search .................. 524/502, 524/515; 525/240
See application file for complete search history.

(56) References Cited

U.S. PATENT DOCUMENTS

| | | | |
|---|---|---|---|
| 2,972,600 | A | 2/1961 | Braidwood |
| 3,248,179 | A | 4/1966 | Norwood |
| 3,287,440 | A | 11/1966 | Giller et al. |
| 4,130,535 | A | 12/1978 | Coran et al. |
| 4,311,628 | A | 1/1982 | Abdou-Sabet et al. |
| 4,543,399 | A | 9/1985 | Jenkins, III et al. |
| 4,588,790 | A | 5/1986 | Jenkins, III et al. |
| 4,594,390 | A | 6/1986 | Abdou-Sabet et al. |
| 4,613,484 | A | 9/1986 | Ayres et al. |
| 5,001,205 | A | 3/1991 | Hoel |
| 5,028,670 | A | 7/1991 | Chinh et al. |
| 5,177,147 | A | 1/1993 | Spenadel et al. |
| 5,317,036 | A | 5/1994 | Brady, III et al. |
| 5,349,005 | A | 9/1994 | Tanaka |
| 5,352,749 | A | 10/1994 | DeChellis et al. |
| 5,405,922 | A | 4/1995 | DeChellis et al. |
| 5,436,304 | A | 7/1995 | Griffin et al. |
| 5,453,471 | A | 9/1995 | Bernier et al. |
| 5,462,999 | A | 10/1995 | Griffin et al. |
| 5,616,661 | A | 4/1997 | Eisinger et al. |
| 5,627,242 | A | 5/1997 | Jacobsen et al. |
| 5,656,693 | A | 8/1997 | Ellul et al. |
| 5,665,818 | A | 9/1997 | Tilston et al. |
| 5,668,228 | A | 9/1997 | Chinh et al. |
| 5,677,375 | A | 10/1997 | Rifi et al. |
| 5,693,727 | A | 12/1997 | Goode et al. |
| 5,712,352 | A | 1/1998 | Brant et al. |
| 6,147,160 | A | 11/2000 | Wang et al. |
| 6,245,856 | B1 | 6/2001 | Kaufman |
| 6,288,171 | B2 * | 9/2001 | Finerman et al. ............ 525/192 |
| 6,342,565 | B1 | 1/2002 | Cheng |
| 6,368,700 | B1 | 4/2002 | Venkataswamy et al. |
| 6,407,174 | B1 | 6/2002 | Ouhadi |
| 6,433,090 | B1 | 8/2002 | Ellul et al. |
| 6,525,157 | B2 | 2/2003 | Cozewith |
| 6,642,316 | B1 | 11/2003 | Datta |
| 6,713,520 | B2 | 3/2004 | Sahnoune |
| 2003/0204017 | A1 | 10/2003 | Stevens et al. |
| 2004/0024146 | A1 | 2/2004 | Friedersdorf |

FOREIGN PATENT DOCUMENTS

| | | |
|---|---|---|
| EP | 0 265 075 | 4/1988 |
| EP | 0 634 421 | 1/1995 |
| EP | 0 794 200 | 9/1997 |
| EP | 0802202 | 10/1997 |
| EP | 0 969 043 | 1/2000 |
| WO | WO 96/33227 | 10/1996 |
| WO | WO 97/22639 | 6/1997 |
| WO | WO 02/051634 A1 | 7/2002 |
| WO | WO 03/040201 | 5/2003 |

OTHER PUBLICATIONS

Ellul et al., "Chemical Surface Treatments of Natural Rubber and EPDM Thermoplastic Elastomers: Effects on Friction and Adhesion, Rubber Chemistry and Technology," vol. 67, No. 4 (1994).

* cited by examiner

Primary Examiner—William K Cheung

(57) ABSTRACT

A TPV composition having improved fabricability and surface appearance is achieved by a process for preparing a thermoplastic vulcanizate composition having a dispersed, cross-linked rubber phase in a continuous thermoplastic polypropylene phase comprising: a) providing into melt processing equipment at least the following components; i) at least one thermoplastic polypropylene homopolymer or copolymer having a melt temperature greater than 120° C.; ii) 6-12 wt. %, based on the total weight of the thermoplastic vulcanizate composition, at least one propylene copolymer having from 7 to 30 wt. % ethylene, based upon the weight of the random propylene copolymer, and a melting point less than 120° C.; iii) at least one cross-linkable rubber, where, if including an ethylene copolymer rubber, said copolymer rubber having equal to or more than 40 wt. % the total copolymer rubber weight; b) melt processing the blend of i), ii), and iii) of a); c) dynamically vulcanizing the cross-linkable rubber iii) in the presence of the thermoplastic i) and random copolymer ii); and d) removing a thermoplastic vulcanizate product of c) from the melt processing equipment, wherein the dispersed, cross-linked rubber phase of the product thermoplastic vulcanizate d) consists of particles having an effective diameter not greater than 2 millimicrons.

11 Claims, No Drawings

THERMOPLASTIC VULCANIZATES HAVING IMPROVED FABRICABILITY

BACKGROUND

1. Field of Invention

Embodiments described generally relate to composite structures and shaped articles comprising thermoplastic vulcanizates and a method of preparing thermoplastic vulcanizates particularly suitable therefore.

2. Description of Related Art

Thermoplastic vulcanizate are well known subset of a group of polymeric materials call thermoplastic elastomers (TPE). TPE materials are both elastomeric and thermoplastic, yet are distinguished from thermoset rubbers, which are elastomeric but not thermoplastic due to the cross-linking or vulcanization of the rubber, and are distinguished from general thermoplastics which are generally stiff and hard, but not elastomeric. Thermoplastic vulcanizates are a class of TPE where cross-linked rubber forms a dispersed, particulate, elastomeric phase within a thermoplastic phase of a stiff thermoplastic such that TPE properties are achieved. The thermoplastic vulcanizates, TPVs or TPV compositions, are conventionally produced by dynamic vulcanization. Dynamic vulcanization is a process whereby a rubber component is crosslinked, or vulcanized, under intensive shear and mixing conditions within a blend of at least one non-vulcanizing thermoplastic polymer component while at or above the melting point of that thermoplastic. Typically, then the rubber forms cross-linked, elastomeric particles dispersed uniformly in the thermoplastic. See, for example U.S. patents U.S. Pat. Nos. 4,130,535, 4,311,268, 4,594,390 and 6,147,160. Dynamically vulcanized thermoplastic elastomers (TPVs) consequently have a combination of both thermoplastic and elastic properties.

Conventional plastic processing equipment can extrude, inject, or otherwise mold, and thus press and shape TPV compositions into useful products alone or in composite structures with other materials. Thus these TPV compositions are used in fabricated parts made by using standard polymer processing techniques like extrusion, co-extrusion, injection molding, co-injection molding, rotational molding, blow molding, co-blow molding, calendaring and thermoforming. These fabricated parts comprising thermoplastic vulcanizates can be made light in weight and attractive, with good durability, and can be reprocessed at the end of their product life to produce a new product. For these reasons, thermoplastic vulcanizates are widely used in industry.

Given this wide use many different polymeric modifiers have been added to provide different properties to basic TPV compositions. For example, EP969043 discloses a TPV composition that has improved elongation to break and toughness, where the TPV comprises A) from 20 to 75 parts by weight of rubber which has been dynamically vulcanized in the presence of a rubber curative; B) from 25 to 80 parts by weight of a combination of 40 to 80 parts by weight of semi-crystalline polypropylene having a melting temperature of at least 120° C. and 60 to 20 parts by weight of a polypropylene copolymer having a peak melting temperature equal to or above 25 and less than 120° C.; wherein said semi-crystalline polypropylene has a heat of fusion of more than 80 joules/gram, and said polypropylene copolymer has a heat of fusion of less than 75 joules/gram and comprises 80 to 95 weight percent repeat units from polypropylene and 5 to 20 weight percent repeat units from one or more other unsaturated olefin monomers having 2 or from 4 to 12 carbon atoms, based on the weight of said polypropylene copolymer; and wherein said rubber is selected from an ethylene-propylene-diene rubber, natural rubber, butyl rubber, halobutyl rubber, halogenated rubber copolymer of p-alkylstyrene and at least one C4-, isomonoolefin, a copolymer of isobutylene and divinyl benzene, a rubber homopolymer of a C4-8 conjugated diene, or a rubber copolymer having at least 50 weight percent repeat units from at least one C4-8 conjugated diene, or combinations thereof. A wide range of proportions is covered and no particular blending sequence is favored, but addition of the copolymer is exemplified as being added to the prepared or formed basic TPV compositions.

The presence of the dynamically vulcanized, cross-linked rubber particles in TPVs, however, can make these TPVs difficult to process. As a result, the presence of flow marks on injection molded articles surface and the presence of surface imperfections on the extruded profiles like hard spots, die lines, die deposit and screen pack blocking during extrusion which also commonly called die plugging. These surface imperfections of final articles are even more visible with soft TPVs which contain more rubber ingredient and consequently the most demanded products in different applications due to their higher elastic property. These surface imperfections are often make existing TPVs unfit in many applications, particularly when the surface of finished articles is visible like extruded weather seals used in automotive and construction applications, different articles made by injection molding like soft touch, sealing profiles like glass encapsulation made by over molding, grips, mats, over-molded skin for automotive interiors, etc. The visible welding lines in injection molding applications are an important weakness of existing TPVs which often results also to a lower weld lines strength. Another area of high interest in the market that existing TPVs have an issue to penetrate is in hose/tube applications for potable water where a smooth interior surface is sought to avoid the build up inside of hose/tube that can lead to microbiological activity.

Conventional attempts to improve the processability of thermoplastic vulcanizates have resulted in the sacrifice of mechanical properties of the TPV such as compression set, e.g., when different rubber is selected or different polymeric modifiers are added, or heavy blooming of additives when such are used as process improvers. There is a need, therefore, for TPVs that have improved processability while retaining good elastomeric mechanical properties.

SUMMARY

A thermoplastic vulcanizate (TPV) with excellent fabricability while retaining a good elastic recovery has been discovered to be particularly suitable for shaped articles, and as shaped components for composite structures. The invention TPV is achieved by a process for preparing a thermoplastic vulcanizate composition having a dispersed, cross-linked rubber phase in a continuous thermoplastic polypropylene phase comprising: a) providing into melt processing equipment at least the following components; i) at least one thermoplastic polypropylene homopolymer or copolymer having a melt temperature greater than 120° C.; ii) 6-12 wt. %, based on the total weight of the thermoplastic vulcanizate composition, at least one propylene copolymer having from 7 to 30 wt. % ethylene, based upon the weight of the propylene copolymer, and a melting point less than 120° C.; iii) at least one cross-linkable rubber, where, if including an ethylene copolymer rubber, said copolymer rubber having equal to or more than 40 wt. % the total copolymer rubber weight; b) melt processing the blend of i), ii), and iii) of a); c) dynamically vulcanizing the cross-linkable rubber iii) in the presence of the thermoplastic i) and copolymer ii); and d) removing a thermoplastic vulcanizate product of c) from the melt processing equipment, wherein the dispersed, cross-linked rubber phase of the product thermoplastic vulcanizate d) consists of particles having an effective diameter not greater than 2 millimicrons.

Excellent fabricability for the invention TPVs means excellent processability and parts with no surface imperfection. Further, TPVs prepared by the process have 1) a maximum compression set ($CS_{max}$) measured at 100° C. for 22 hours compression with 25% deformation not greater than that 12 points of a polypropylene-based TPV of the same hardness not containing a propylene copolymer with melting temperature below 120° C. and 2) exhibit die plug free operation when extruded from an extruder at a pressure of not greater 10 bar for at least 6 hours. Additionally, the surface of shaped parts from the invention compositions showed an unexpectedly high gloss.

Also provided is the use of from 6 wt % to 12 wt % based on total weight of the composition a propylene copolymer that (i) has 60 wt % or more units derived from propylene, (ii) includes isotactically arranged propylene derived sequences and (iii) has a heat of fusion less than 45 J/g in a thermoplastic vulcanizate composition comprising of from 10 wt % to 50 wt % based on total weight of the composition, a dispersed, particulate rubber component, and of from 5 wt % to 50 wt % based on total weight of the composition, a polyolefinic thermoplastic resin component for the purpose of improving fabricability and surface appearance.

DETAILED DESCRIPTION

The term "thermoplastic vulcanizate composition" (also referred to as simply thermoplastic vulcanizate or TPV) is broadly defined as any material that includes a dispersed, at least partially vulcanized, rubber component; a thermoplastic resin component; and an additive oil. A TPV material may further include other ingredients and additives.

The term "vulcanizate" means a composition that includes some component (e.g., rubber component) that has been vulcanized. The term "vulcanized" is defined herein in its broadest sense, as reflected in any issued patent, printed publication, or dictionary, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (crosslinking) that results in a measurable change in pertinent properties, e.g., a change in the melt flow index (MFI) of the composition by 10% or more (according to any ASTM-1238 procedure). In at least that context, the term vulcanization encompasses any form of curing (crosslinking), both thermal and chemical, that can be utilized in dynamic vulcanization.

The term "dynamic vulcanization" means vulcanization or curing of a curable rubber blended with a thermoplastic resin under conditions of shear at temperatures sufficient to plasticize the mixture. In at least one embodiment, the rubber is simultaneously crosslinked and dispersed as micro-sized particles within the thermoplastic resin component. Depending on the degree of cure, the rubber to thermoplastic resin component ratio, compatibility of the rubber and thermoplastic resin component, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the thermoplastic vulcanizate. For example, at least 5 wt % and less than 20 wt % or 30 wt % or 50 wt % of the crosslinkable rubber may be extractable from the specimen of the thermoplastic vulcanizate in boiling xylene. The percentage of extractable rubber can be determined by the technique set forth in U.S. Pat. No. 4,311,628, and the portions of the patent referring to the technique are incorporated by reference.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight the weight of the soluble components, other than the rubber to be vulcanized, such as extender oils, plasticizers and components of the compositions soluble in organic solvent, as well as that rubber component that it is not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition, up to about 5 weight percent, typically between about 0.5 to about 2.0 weight percent, of EPDM rubber is soluble in refluxing xylene.

A "fully vulcanized" (or fully cured or fully crosslinked) rubber is one wherein less than 5 weight percent (wt %) of the crosslinkable rubber is extractable in boiling xylene subsequent to dynamic vulcanization, e.g., crosslinking of the rubber phase of the thermoplastic vulcanizate. Preferably, 4 wt % or less, or 3 wt % or less, or 2 wt % or less, or 1 wt % or less of the crosslinkable rubber is extractable in boiling xylene.

Rubber Component

The "rubber component" can be any material that is considered by persons skilled in the art to be a "rubber," preferably a crosslinkable rubber (e.g., prior to vulcanization) or crosslinked rubber (e.g., after vulcanization). For example, the rubber component can be any olefin-containing rubber such as ethylene-α-olefin copolymer rubber said α-olefin having 3 to 8 carbon atoms (EPM), preferably having equal to more than 40 wt. % of the copolymer being ethylene. EPM which can be vulcanized using free radical generators such as organic peroxides, as noted in U.S. Pat. No. 5,177,147. Another ethylene copolymer rubber embodiment includes ethylene-propylene-diene (EPDM) rubber, or EPDM-type rubber, for example. An EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. In a preferred the EPDM is an ethylene-propylene-diene copolymer rubber having an ethylene content equal to or greater than 40 wt. % the total copolymer rubber weight. Preferred diene monomers, for assuring excellent cure state, are ethylidene norbornene and vinyl norbornene.

The rubber component can also be a butyl rubber. The term "butyl rubber" includes a polymer that predominantly includes repeat units from isobutylene but also includes a few repeat units of a monomer that provides a site for crosslinking. Monomers providing sites for crosslinking include a polyunsaturated monomer such as a conjugated diene or divinyl benzene. In one or more embodiments, the butyl rubber polymer can be halogenated to further enhance reactivity in crosslinking. Those polymers are referred to as "halobutyl rubbers."

Further, the rubber component can be homopolymers of conjugated dienes having from 4 to 8 carbon atoms and rubber copolymers having at least 50 weight percent repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

A list of preferred rubber components include, but are not limited to, the preferred ethylene-propylene-diene rubber, natural rubber, butyl rubber, halobutyl rubber, halogenated rubber copolymer of p-alkylstyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereon.

In one or more embodiments above or elsewhere herein, the rubber component is present in an amount of from 10 wt % to 40 wt %, or from 15 wt % to 35 wt %, or from 20 wt % to 40 wt %, based on total weight of the thermoplastic vulcanizate composition. In one or more embodiments above or elsewhere herein, the presence of the rubber component ranges from a low of 10 wt %, 15 wt %, or 20 wt % to a high of 30 wt %, 35 wt %, or 40 wt %, based on total weight of the thermoplastic vulcanizate composition.

Polyolefinic Thermoplastic Resin Component

The polyolefinic thermoplastic resin can be any material that is not a "rubber" and that is a polymer or polymer blend considered by persons skilled in the art as being thermoplastic in nature, e.g., a polymer that softens when exposed to heat and returns to its original condition when cooled to room temperature. The polyolefinic thermoplastic resin component can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the polyolefinic thermoplastic resin component is unvulcanized or non cross-linked.

In one or more embodiments above or elsewhere herein, the thermoplastic vulcanizate composition includes of from 5 wt % to 30 wt %, or from 7 wt % to 20 wt %, or from 8 wt % to 15 wt %, or from 9 wt % to 13 wt % of the polyolefinic thermoplastic resin component, based on total weight of the TPV composition. In one or more embodiments above or elsewhere herein, the presence of the polyolefinic thermoplastic resin component ranges from a low of 5 wt % or 6 wt % to a high of 10 wt % or 15 wt %, based on total weight of the TPV composition.

In one or more embodiments, the polyolefinic thermoplastic resin component contains polypropylene. The term "polypropylene" as used herein broadly means any polymer that is considered a "polypropylene" by persons skilled in the art (as reflected in at least one patent or publication), and includes homo, impact, and random copolymers of propylene. Preferably, the polypropylene used in the compositions described herein has a melting point above 120° C., preferably at or above 140° C., includes at least 90 wt % propylene units, and contains isotactic sequences of those units. The polypropylene can also include atactic sequences or syndiotactic sequences, or both. The polypropylene can also include essentially syndiotactic sequences such that the melting point of the polypropylene is above 110° C. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ α-olefins. As noted elsewhere herein, certain polypropylenes have a high MFI (e.g., from a low of 10, or 15, or 20 g/10 min to a high of 25 to 30 g/10 min. Others have a lower MFI, e.g., "fractional" polypropylenes which have an MFI less than 1.0. Those with high MFI can be preferred for ease of processing or compounding.

In one or more embodiments, the polyolefinic thermoplastic resin component is or includes isotactic polypropylene. Preferably, the polyolefinic thermoplastic resin component contains one or more crystalline propylene homopolymers or copolymers of propylene having a melting temperature greater than 120° C. as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such polyolefinic thermoplastic resin components and methods for making the same are described in U.S. Pat. No. 6,342,565.

Thermoplastic Modifier

In one or more embodiments, the TPV can include up to about 10 wt % or more based on total polymeric content of one or more thermoplastic modifiers to adjust the mechanical properties of the TPV. Illustrative thermoplastic modifiers include, but are not limited to un-crosslinked ethylene-propylene rubber, very low density and linear low polyethylene copolymers, and styrenic block copolymers. Illustrative styrenic block copolymer include, but are not limited to, styrene-olefin-styrene triblock copolymers such as styrene-butadiene-styrene (S-B-S), styrene-ethylene/butylene-styrene (S-EB-S), styrene-ethylene/propylene-styrene (S-EP-S), styrene-isoprene-styrene (S-I-S), hydrogenated polystyrene-isoprenelbutadiene-styrene (S-IB-S), derivatives thereof, and blends thereof.

In one or more embodiments, the one or more thermoplastic modifiers are functionalized with from about 0.2 to about 5 wt % polar moieties, such as carboxy-acids/anhydrides, amino, and epoxy moieties, for example. Commercially useful modifiers include ExxonMobil Chemical Company products Exxelor PO 1015 (polypropylene functionalized with 0.25 to 0.5 wt. % maleic anhydride) and Exxelor VA 1840 (ethylene copolymer functionalized with 0.25 to 0.5 wt. % maleic anhydride). Other examples include Kraton Polymers product KRATON FG1901X (styrene-ethylene-butene-styrene copolymer functionalized with 1.7 to 2.0 wt % maleic anhydride).

Additive Oil

The term "additive oil" includes both "process oils" and "extender oils." For example, "additive oil" can include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene, e.g., products sold under the trademark Parapol®. Other additive oils can also be used, such as oils derived from coal tar and pine tar, as well as synthetic oils, e.g., polyolefin materials (e.g., SpectraSyn™, supplied by ExxonMobil Petroleum & Chemical Co.). Certain rubber components (e.g., EPDMs, such as Vistalon 3666, ExxonMobil Chemical) include additive oil that is preblended before the rubber component is combined with the thermoplastic. The type of additive oil utilized will be that customarily used in conjunction with a particular rubber component.

The ordinarily skilled chemist will recognize which oil should be used with a particular rubber, and also be able to determine the amount (quantity) of oil. The additive oil can be present in amounts from about 5 to about 300 parts by weight per 100 parts by weight of the blend of the rubber and isotactic polypropylene components. The amount of additive oil can also be expressed as from about 30 to 250 parts, and more desirably from about 70 to 200 parts by weight per 100 parts by weight of the rubber component. Alternatively, the quantity of additive oil can be based on the total rubber content, and defined as the ratio, by weight, of additive oil to total rubber. That amount can in certain cases be the combined amount of process oil (typically added during manufacturing of TPV before and/or after curing the rubber) and extender oil (typically added in the rubber during its manufacturing). The ratio can range, e.g., from about 0 to about 4.0/1. Other ranges, having any of the following lower and upper limits, can also be utilized: a lower limit of 0.1/1, or 0.6/1, or 0.8/1, or 1.0/1, or 1.2/1, or 1.5/1, or 1.8/1, or 2.0/1, or 2.5/1; and an upper limit (which can be combined with any of the foregoing lower limits) of 4.0/1, or 3.8/1, or 3.5/1, or 3.2/1, or 3.0/1, or 2.8/1. Larger amounts of additive oil can be used, although the deficit is often reduced physical strength of the composition, or oil weeping, or both.

Rubber Curing Agent

Any curative that is capable of curing or crosslinking the rubber component can be used. Illustrative curatives include, but are not limited to, phenolic resins, peroxides, maleimides, and silicon-containing curatives. Depending on the rubber employed, certain curatives can be preferred. For example, where elastomeric copolymers containing units deriving from vinyl norbornene are employed, a peroxide curative can be preferred because the required quantity of peroxide will not have a deleterious impact on the engineering properties of the thermoplastic phase of the thermoplastic vulcanizate. In other situations, however, it can be preferred not to employ peroxide curatives because they can, at certain levels, degrade the thermoplastic components of the thermoplastic vulcanizate.

A preferred curative contains one or more phenolic resins. Phenolic resins are described in U.S. Pat. Nos. 2,972,600; 3,287,440; and 6,433,090. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and can be referred to as phenolic resin curatives or phenolic resins. The phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, see U.S. Pat. No. 4,311,628.

Useful silicon-containing curatives generally include silicon hydride compounds having at least two SiH groups. These compounds react with carbon-carbon double bonds of unsaturated polymers in the presence of a hydrosilylation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof.

Peroxide curatives are generally selected from organic peroxides. Examples of organic peroxides include, but are not limited to, di-tert-butyl peroxide, dicumyl peroxide, t-butylcumyl peroxide, alpha,alpha-bis(tert-butylperoxy)diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy)valerate, benzoyl peroxide, lauroyl peroxide, dilauroyl peroxide, 2,5-dimethyl-2,5-di(tert-butylperoxy)hexene-3, and mixtures thereof. Also, diaryl peroxides, ketone peroxides, peroxydicarbonates, peroxyesters, dialkyl peroxides, hydroperoxides, peroxyketals and mixtures thereof can be used. For a further discussion of peroxide curatives and their use for preparing thermoplastic vulcanizates, reference can be made to U.S. Pat. No. 5,656,693.

OTHER ADDITIVES

The term "other additives" may include, but is not limited to, lubricants, antioxidants, antiblocking agents, stabilizers, anti-degradants, anti-static agents, waxes, foaming agents, pigments, processing aids, adhesives, tackifiers, plasticizers, wax, and discontinuous fibers (such as world cellulose fibers). Illustrative particulate fillers include, but are not limited to carbon black, silica, titanium dioxide, calcium carbonate, colored pigments, clay, and combinations thereof. When non-black fillers are used, it may be desirable to include a coupling agent to compatibilize the interface between the non-black fillers and polymers. Desirable amounts of carbon black, or other colorants, when present, are from about 5 to about 250 parts by weight per 100 parts by weight of rubber.

Propylene Copolymer

In the TPV compositions of the invention, the thermoplastic modifier is, or includes, a "propylene copolymer." A "propylene copolymer" includes at least two different types of monomer units, one of which is propylene. Suitable monomer units include, but are not limited to, ethylene and higher α-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene copolymer includes propylene units (units on the polymer chain derived from propylene monomers) and ethylene units (units derived from ethylene monomers).

In one or more embodiments, the propylene copolymer contains at least 70 wt % of propylene-derived units. In one or more embodiments, the propylene copolymer contains from 75 wt % to 94 wt % of propylene-derived units. In one or more embodiments, the propylene copolymer contains from 80 wt % to 90 wt % of propylene-derived units. In one or more embodiments, the propylene copolymer can consist essentially of from 80 to 95 wt % repeat units from propylene and from 5 to 20 wt % of repeat units from one or more unsaturated olefin monomers having 2 or 4 to 12 carbon atoms.

Preferably, the propylene copolymer is a propylene/ethylene copolymer having an ethylene content of 7 wt % or more, 10 wt % or more, 15 wt % or more, 20 wt % or more, or up to 30 wt %, based on total weight of the propylene copolymer. In one or more embodiments above or elsewhere herein, the propylene copolymer is a propylene/ethylene copolymer having an ethylene content of from 7 wt % to 30 wt %, or from 7 wt % to 20 wt %, or from 10 wt % to 18 t % based on total weight of the propylene copolymer.

Preferably, the propylene copolymer has crystalline regions interrupted by non-crystalline regions. The non-crystalline regions can result from regions of non-crystallizable polypropylene segments, the inclusion of comonomer units, or both. In one or more embodiments, the propylene copolymer has a propylene-derived crystallinity that is isotactic, syndiotactic, or a combination thereof. In a preferred embodiment, the propylene copolymer has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

Broadly, the propylene-derived units of the propylene copolymer have an isotactic triad fraction of about 65% to about 99%. In one or more embodiments, the propylene-derived units of the propylene copolymer have an isotactic triad fraction of about 70% to about 98%. In one or more embodiments, the propylene-derived units of the propylene copolymer have an isotactic triad fraction of about 75% to about 97%.

Due to the introduction of errors in the insertion of propylene and/or by the presence of comonomer, the crystallinity and the melting point of the propylene copolymer are reduced compared to highly isotactic polypropylene. For example, the propylene-derived crystallinity of the propylene copolymer can range from about 2% to about 65% in one embodiment and from about 5% to about 40% in another embodiment as measured by Differential Scanning Calorimetry (DSC).

The crystallinity of the propylene copolymer can also be expressed in terms of "heat of fusion," measured by Differential Scanning Calorimetry (DSC), most preferably in accordance with ASTM E-794-95. Preferably, about 6 mg to about 10 mg of a sheet of the polymer to be tested is pressed at approximately 200° C. to 230° C., then removed with a punch die and annealed at room temperature for 48 hours. Afterwards, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak(s) of the sample, which is typically at a maximum peak at about 30° C. to about 175° C. and occurs between the temperatures of about 0° C. and about 200° C. The thermal output is measured in Joules as a measure of the heat of fusion.

The propylene copolymer can have a heat of fusion ranging broadly from 1.0 J/g to 90 J/g; or more narrowly from 2 J/g to 40 J/g; or from 5 J/g to 35 J/g; or from 7 J/g to 25 J/g. In one or more specific embodiments, the propylene copolymer has a heat of fusion of 75 J/g or less, or 50 J/g or less, or 35 J/g or less. Preferably, the propylene copolymer has a heat of fusion less than 45 J/g.

The "melting point" can be measured using the DSC test described above. Using the DSC test, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak can be at a low temperature and be relatively flat, making it difficult to determine the precise peak location. Furthermore, as with the DSC method, the peak location can be influenced by annealing and relaxation treatments. Therefore, it is recommended that the sample pretreatment procedure stated above for the DSC be followed.

The propylene copolymer can have any one of the following melting points, ranging from a lower limit of 25° C., or 30° C., or 35° C., or 40° C., or 45° C., or 50° C., to a higher limit of below about 120° C., or 100° C., or 95° C., or 90° C., or 85° C., or 80° C., or 85° ., or 80° C., or 75° C., or 70° C. In other specific embodiments, the melting point of the propylene copolymer can be expressed as any one of a selection of ranges, e.g., ranges of from 30° C. to 70° C. or from 40° C. to 50° C.

The crystallinity interruption described above can be predominantly controlled by the incorporation of the non-propylene monomer units. Accordingly, the comonomer content of the propylene copolymer can range from about 7 wt % to about 30 wt % in one embodiment and from about 8 wt % to about 30 wt % in another embodiment and from about 8 wt % to about 20 wt % in still another embodiment. In one or more of the compositions described herein, the propylene copolymer can have a comonomer content of greater than 8 wt %; or greater than 10 wt %; or greater than 12 wt %; or greater than 15 wt %.

Furthermore, the propylene-derived crystallinity of the propylene copolymer can be selected to ensure the desired compatibility with the other ingredients of the TPV composition, e.g., with the other polymers in the thermoplastic resin component, as well as with the rubber component and additives. In a preferred aspect, the propylene-derived crystallinity is selected relative to any polypropylene resin present in the thermoplastic resin component. In some embodiments, the tacticity of the propylene copolymer and the tacticity of the thermoplastic resin component (which can include two or more different polypropylene polymers) can be the same or substantially the same. By "substantially" it is meant that these two components have at least 80% of the same tacticity. In another embodiment, the components have at least 90% of the same tacticity. In still another embodiment, the components have at least 100% of the same tacticity. Even if the components are of mixed tacticity, e.g., being partially isotactic and partially syndiotactic, the percentages in each should be at least about 80% the same as the other component in at least one or more embodiments.

In one or more embodiments, the propylene copolymer is made using random polymerization methods, including those described in U.S. Pat. Nos. 6,288,171; 6,525,157 5,001,205; WO 96/33227; WO 97/22639; U.S Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,693,727; 3,248,179; 4,613,484; 5,712,352; EP-A-0 794 200; EP-A-0 802 202; and EP-B-634 421. However, the propylene copolymer is not limited by any particular polymerization method. Suitable polymerization methods include gas phase, slurry, and solution, for example.

The propylene copolymer is also not limited by any or any particular type of reaction vessel. The propylene copolymer can in certain embodiments be formed in a single reactor. The propylene copolymer can in certain embodiments be formed in one or more series reactors (e.g., two or more reactors arranged in series). The propylene copolymer can in certain embodiments be formed in a batch reactor. Preferably, the continuous polymerization methods have sufficient back-mixing such that there are no concentration gradients within the reactor. Preferably, the propylene copolymer is formed using solution polymerization (as opposed to slurry or gas-phase polymerization) such that the catalyst system exists in a single-phase environment.

The propylene copolymer is not limited by any particular catalyst or catalyst system. In one or more embodiments, the catalyst system can include one or more transition metal compounds and one or more activators. Multiple activators can be used, including using mixtures of alumoxanes or aluminum alkyls with ionizing activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. In one or more embodiments, the one or more catalyst systems disclosed in U.S. Patent Application 20040024146 published Feb. 5, 2004, can be used. In one or more embodiments, nonmetallocene, metal-centered, heteroaryl ligand catalyst systems as described in U.S. Patent Application 20030204017 published Oct. 30, 2003, can be used.

Preferably, the propylene copolymer is made in the presence of a metallocene catalyst system. As a nonlimiting example, illustrative metallocene catalyst systems can include, but are not limited to, a bis-indenyl compound, particularly a bridged bis-indenyl compound, and even more particularly a bridged bis-indenyl compound without any 2-substitutions. Alternatively, however, in one or more specific embodiments, any propylene copolymer used in an elastomeric structure can be prepared using a single site catalyst capable of permitting tactic insertion. For example, in at least certain embodiments, a polymer made in accordance with the disclosure of WO 03/0404201 can qualify as a "propylene copolymer."

In one or more embodiments, the propylene copolymer has a Shore A hardness of less than about 90. In one or more embodiments, the propylene copolymer a Shore A hardness of about 45 to about 90. In one or more embodiments, the propylene copolymer has a Shore A hardness of about 55 to about 80.

In one or more embodiments, the propylene copolymer can have a molecular weight distribution (MWD) $M_w/M_n$ ranging from 1.5 to 40; or from 2 to 20; or from 2 to 10; or from 2 to 5. In one or more embodiments, the propylene copolymer can have a number average molecular weight of from 10,000 to 5,000,000; or from 40,000 to 300,000; or from 80,000 to 200,000, as determined by gel permeation chromatography (GPC). In one or more embodiments, the propylene copolymer can have a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol. Further, the propylene copolymer can have a Mooney viscosity (ML (1+4)@125° C.) from a low of 50, or 60, or 75, to a high of 80, or 90, or 100. Vistamaxx® is an illustrative propylene copolymer product, and is commercially available from Exxon Mobil Chemical Company.

In one or more embodiments above or elsewhere herein, the propylene copolymer is present in the amount of about 6 wt % or about 7 wt % or about 8 wt % or about 9 wt %, based on total weight of the thermoplastic vulcanizate composition. In one or more embodiments above or elsewhere herein, the propylene copolymer is present in the amount ranging from a low of 7 wt % or 8 wt % to a high of 9 wt % or 10 wt %, based on total weight of the thermoplastic vulcanizate composition.

Process Description

Any process for making TPVs can be employed, so long as the propylene copolymer is added prior to the dynamic vulcanization of the crosslinkable rubber. For example, the individual materials and components, such as the one or more rubber components, polyolefinic thermoplastic resin components, thermoplastic modifiers, including the propylene copolymer, curing agents, additive oils, and other additives, can be mixed at a temperature above the melting temperature of the thermoplastic components to form a melt. Illustrative mixing equipment include: extruders with kneaders or mixing elements with one or more mixing tips or flights, extruders with one or more screws, and extruders of co or counter rotating type. Suitable mixing equipment also includes Brabender™ mixers, Banbury™ mixers, Buss mixers and kneaders, and Farrell Continuous mixers, for example. One or more of those mixing equipment, including extruders, can be used in series.

The one or more polyolefinic thermoplastic resin components, thermoplastic modifiers, rubber components, and curing agents can be added to a heated mixer as individual feed streams, as a tumbled blend, or as a masterbatch. The one or more polyolefinic thermoplastic resin components can be added before cure, after cure, or divided in any proportions between before cure and after cure. Similarly, the one or more thermoplastic modifiers, including portions of one or more of the one or more propylene copolymers, can be added before cure, after cure, or divided in any proportions between before cure and after cure. The additive oil, e.g. process oil, can be added during mastication, before cure, after cure, or divided in any proportions between before cure and after cure.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example. In the event a peroxide curative is used, the rubber components, peroxide curatives and enough of the one or more thermoplastic resin components to provide the plastic matrix, in which the rubber disperses, are blended to form the melt. Once the desired cure level is achieved, the remainder of the one or more thermoplastic resin components is added in any proportions to avoid any unintended break down or crosslinking of the one or more thermoplastic resin components. A side feeder for a single screw or twin screw extruder can be used to add the remaining portions of the thermoplastic resin components. In which case, the side feeder is preferably positioned after (downstream) the desired level of cure is obtained within the extruder.

The one or more mineral fillers and other additives can be introduced to the melt before, during or after cure. The additives, fillers or other compounds, which can interfere with the curing agents, should be added after curing reaches the desired level. Preferably, the one or more mineral fillers and other additives are added to the melt as a slurry or paste in a compatible rubber process oil. Powder blends or masterbatches of these components can be prepared in a wax or polymer carrier to facilitate metering and mixing. A side feeder can also be used to add the one or more mineral fillers and other additives.

The required mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV is described in U.S. Pat. No. 4,594,390.

Articles

The thermoplastic vulcanizates of the invention are useful for the fabrication of parts made by using standard polymer processing techniques like extrusion, co-extrusion, injection molding, co-injection molding, rotational molding, blow molding, co-blow molding, calendaring and thermoforming. More specifically, the thermoplastic vulcanizates described are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In one or more embodiments, the TPVs described may be at least partially adhered or otherwise at least partially attached to a second component or substrate to form a composite structure. The second component may be another thermoplastic elastomer or thermoplastic vulcanizate. The second component may also be, or include, a thermoset rubber, thermoplastic, or thermoplastic rubber. In one or more embodiments, the two or more elastomeric structures are at least partially adhered or otherwise at least partially attached to one another by extrusion, injection molding, blow molding, or compression molding techniques to form a composite structure. Illustrative composite structures include, but are not limited to, molded corners, molded end caps, glass run channels, trunk seals, tailgate seals, cowl seals, gap fillers, glass encapsulation, cut line seals, door seals, hood-to-radiator seals, roof line seals, rocker panels, sashes, and belt-line seals. A particular belt-line seal is shown and described in U.S. Pat. No. 6,368,700 which is incorporated by reference in that regard. Other particular automotive seals can be found at http:\\www.santoprene.com.

In one or more embodiments, the TPVs described can be at least partially adhered to a glass substrate, such as for glass encapsulation. Illustrative uses for glass encapsulation include windshield seals, sunroof seals, rear window seals, side window seals, and quarterlight seals, for example. Preferably, the thermoplastic elastomer composition is extruded using techniques known in the art to form an extruded elastomeric profile or gasket. This extruded profile or gasket is then adhered to the glass substrate.

Glass Encapsulation

The term "glass" as used herein refers to any substrate or surface of glass, ceramics, enamel, silicate (coated on plastics or metals) and other silicate containing product, such as clay or concrete. Preferably, the TPV composition is adhered to a glass substrate using an adhesive composition. The adhesive composition may be used alone or in conjunction with a primer. For example, the primer may be applied to the glass surface before the adhesive composition. Alternatively, the primer may be mixed with the adhesive composition and applied to the glass surface as a single mixture.

Adhesive Composition

A preferred adhesive composition includes one or more halogenated polyolefins, one or more crosslinkable resins, and one or more isocyanate crosslinking agents. The halogenated polyolefin is preferably a halogenated alpha-monoolefin polymer. Preferably, the crosslinkable resin is melamine resin, acrylic resin, or epoxy resin having functional groups capable of reacting with the isocyanate group of the isocyanate crosslinking agent. Illustrative crosslinkable resins include, but are not limited to, Resimene®, Macrynal® SM540/60X, D.E.R.®, D.E.N.®, Tactix®, Quartex®, Epon®, Epikote®, Eponol®, Eponex®, Araldite®, Aracast®, Epi-Rz®, Epotuf®, Unox®, Neukadur®, Biresin®, Araldite GT6097CH®, and Ebalta LM®.

Preferably, the crosslinking agents include any diisocyanate having two reactive isocyanate groups. Illustrative diisocyanates include, but are not limited to, 1,6-hexamethylene diisocyanate; 1,8-octomethylene diisocyanate; 1,12-dodecamethylene diisocyanate; 2,2,4-trimethylhexamethylene diisocyanate and similar isocyanates. An illustrative crosslinking agent, includes but is not limited to, isophorone diisocyanate (3-isocyanatomethyl-3,5,5-trimethylcyclohexyl isocyanate) a blocked isocyanate, commercially available as Vestanat® IPDI and Vestanat® T 1890/100.

Silane Primer

In one or more embodiments, the primer includes one or more silane primers. Illustrative silane primers include, but are not limited to, Dynasylan® 3201, Dynasylan® AMEO, Dynasylan® GLYMO, Betawipe VP® 046404, Sika®-Activator, and Terostat®-8540. In one or more embodiments, the primer can be dissolved in a solvent to facilitate the thin coating of the glass. That solution is then applied to the glass surface as thinly as possible by spraying, brushing or wiping.

SPECIFIC EMBODIMENTS

Various specific embodiments are described below. For example, at least one specific embodiment is directed to an extrudable thermoplastic vulcanizate comprising of from 10 wt % to 50 wt % of a dispersed rubber component, of from 5 wt % to 50 wt % of a polyolefinic thermoplastic resin component, of from 0 wt % to 50 wt % of an additive oil, and of from 6 wt % to 12 wt % of a propylene copolymer that (i) has 60 wt % or more units derived from propylene, (ii) includes isotactically arranged propylene derived sequences and (iii) has a heat of fusion less than 45 J/g. The described propylene copolymer embodiments are also suitable for use as a thermoplastic modifier for the purpose of improving the die plug free operation and reducing surface effects in the shaping or forming of articles of commerce from TPV compositions. At least one specific embodiment is directed to a glass article comprising a glass substrate that is at least partially adhered to the extrudable thermoplastic vulcanizate composition.

EXAMPLES

The thermoplastic vulcanizates described surprisingly demonstrate improved processability (fabricability) and improved surface appearance, and gloss, while retaining a compression set measured at 100° C. for 22 hours compression with 25% deformation not greater than 12 points of a polypropylene-based TPV of the same hardness not containing a propylene copolymer. The improved surface appearance is observed by the decreased extrusion surface roughness, surface spot count, die lines and by absence of flow mark on injection molded parts. Extrusion surface roughness is a measure of surface texture as described in "Chemical Surface Treatments of Natural Rubber and EPDM Thermoplastic Elastomers: Effects on Friction and Adhesion, Rubber Chemistry and Technology," Vol. 67, No. 4 (1994). Surface spot count is a visual measure of the number of surface spots on an extruded thermoplastic vulcanizate sample.

The following examples illustrate the improved fabricability and surface appearance of the TPV compositions described. For purposes of convenience, various specific test procedures are identified for determining certain physical properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Example 1

Nine samples were prepared. Samples 1 and 5 are comparative and do not include any of the propylene copolymers A-D. Sample 4 which contains 16.98 wt % Propylene copolymer A with a compression set of 45% measured at 100° C. with 22 hours compression with 25% deformation is for comparative purpose. Sample 6 which contains 4.32 wt % Propylene copolymer B with flow mark observed in injection molded plaque is for comparative purpose. Sample 9 which is made via two-pass technology where the propylene copolymer is added to a TPV in a second mixing. showing poor extrusion. Each of sample 1-9 were prepared according the formulation shown in Table 1. A ZSK 53 mm twin-screw extruder with length over diameter ratio=42 and composed of 12 barrels is used for the preparation of all the examples. In all the examples except Sample 9 Comparative, a powder blend of the Icekap K clay, zinc oxide, and stannous chloride was mixed in a Henschel mixer. That powder blend and a mixture of all the polymers including polyolefinic thermoplastic components, thermoplastic modifiers, rubber component, propylene copolymer were added together at up stream in barrel 1, one part (40 to 60% ) of processing oil is added before curing agent (SP1045 in the examples) and second part of oil is added after curing agent. Curing agent (SP1045 in the examples) was added in barrel 4 of the extruder. Sample 9 Comparative was made by a adding the propylene copolymer feed stock to the feedstock TPV composition together up stream in a second mixing device, or adding the propylene copolymer downstream of the curing of the rubber in the extruder. The extruder operated at a screw rate of 80 kg/hour at 350 RPMs for a run time of 165 minutes. The transition time was 10 minutes.

The blends were intensively mixed (shear rate>100 s$^{-1}$) in the initial section of the extruder to melt the plastic (by shear heating and external heat applied via the extruder barrel) and to form an intimate blend of the feed materials.

After venting volatiles from the blend, the rubber curative was fed into the extruder to commence dynamic vulcanization. During the production process, the melt temperatures varied from 180° C. to 240° C., the higher melt temperatures being recorded in the curing zone.

Table 1 provides the formulations of the Samples. Table 2 provides detailed information about the individual components of the resulting TPV compositions. The extruded TPV materials were tested according to the test procedures listed in Table 3. The test results are shown in Tables 4-9.

TABLE 1

Formulations in weight percent.

| | Sample | | | | | | |
|---|---|---|---|---|---|---|---|
| | 1 (Comp.) | 2 | 3 | 4 (Comp.) | 5 (Comp.) | 6 (Comp.) | 7 |
| VISTALON 3666 | 52.5 | 51.2 | 51.2 | 50.8 | 52 | 52.5 | 51.0 |
| ICECAP K Clay | 3.6 | 3.6 | 3.6 | 3.6 | 3.6 | 3.6 | 3.6 |
| EQUISTAR 51S07A PP | 12.0 | 8.83 | 8.83 | 6.11 | 10.4 | 7.84 | 6.38 |
| ZnO | 0.6 | 0.6 | 0.6 | 0.6 | 0.6 | 0.6 | 0.6 |
| SnCl$_2$ | 0.39 | 0.39 | 0.39 | 0.39 | 0.38 | 0.38 | 0.38 |

TABLE 1-continued

Formulations in weight percent.

| | | | | | | | |
|---|---|---|---|---|---|---|---|
| SUNPAR 150 M Oil | 21 | 17.1 | 17.1 | 11.9 | 20.2 | 18.0 | 16.7 |
| AMPACET 49974 | 7.50 | 7.34 | 7.34 | 7.28 | 10.4 | 10.4 | 10.5 |
| SP 1045 | 2.4 | 2.35 | 2.35 | 2.33 | 2.38 | 2.40 | 2.34 |
| Propylene copolymer A | — | — | — | 16.98 | — | — | — |
| Propylene copolymer B | — | — | — | — | — | 4.32 | 8.53 |
| Propylene copolymer C | — | — | 8.56 | — | — | — | — |
| Propylene copolymer D | — | 8.56 | — | — | — | — | — |

| | Sample | | | |
|---|---|---|---|---|
| | 8 | 3 | Feed stock for Sample 9 Comp. | 9 (Comp.) |
| VISTALON 3666 | 53.88 | 51.2 | 56.15 | — |
| ICECAP K Clay | 3.70 | 3.6 | 3.86 | — |
| EQUISTAR 51S07A PP | 10.02 | 8.83 | 9.65 | — |
| ZnO | 0.61 | 0.60 | 0.64 | — |
| SnCl$_2$ | 0.39 | 0.39 | 0.40 | — |
| SUNPAR 150 M Oil | 14.47 | 17.10 | 18.71 | — |
| -MPACET 49974 | 7.70 | 7.34 | 8.02 | — |
| SP 1045 | 2.46 | 2.35 | 2.57 | — |
| Propylene copolymer B | 6.77 | — | — | — |
| Propylene copolymer C | — | 8.56 | — | 8.56[1] |
| Feed Stock for sample 9 Comp. | — | — | — | 91.44 |

[1]Added after curing of the rubber

Propylene copolymer A is a metallocene catalyzed polypropylene/polyethylene copolymer having 10.97 wt % of ethylene. The melting point was about 50° C. The heat of fusion was about 15 J/g. The Mooney viscosity (ML (1+4) at 125° C.) was 24 as measured according to ASTM D 1646.

Propylene copolymer B is a metallocene catalyzed polypropylene/polyethylene copolymer having 17.46 wt % of ethylene. The melting point was about 50° C. The heat of fusion was about 15 J/g. The Mooney viscosity (ML (1+4) at 125° C.) was 22.7 as measured according to ASTM D 1646.

Propylene copolymer C is a metallocene catalyzed polypropylene/polyethylene copolymer having 11.5 wt % of ethylene. The melting point was about 50° C. The heat of fusion was about 15 J/g. The Mooney viscosity (ML (1+4) at 125° C.) was 10 as measured according to ASTM D 1646.

Propylene copolymer D is a metallocene catalyzed polypropylene/polyethylene copolymer having 11.7 wt % of ethylene. The melting point was about 50° C. The heat of fusion was about 15 J/g. The Mooney viscosity (ML (1+4) at 125° C.) was 17.2 as measured according to ASTM D 1646.

Propylene copolymers A-D were each prepared in a 1 Liter internal volume Continuous Flow Stirred Tank Reactor. Hexane was used as the solvent. The liquid full reactor had a variable residence time of approximately 9 to 15 minutes and the pressure was maintained at 700 kPa. A mixed feed of hexane, ethylene and propylene was pre-chilled to approximately −30° C. to remove the heat of polymerization before entering the reactor. The solution of catalyst/activator in toluene and the scavenger in hexane were separately and continuously added to the reactor to initiate the polymerization. The reactor temperature was maintained around 70° C. Hexane at 3.56 kg/hr was premixed with both ethylene at rate 60 g/hr and propylene at rate 812 g/hr and fed to the reactor. The polymerization catalyst, dimethyl silyl bridged bis-indenyl hafnium dimethyl, was activated in situ in 1:1 molar ratio with N, N'-Dimethyl anilinium-tetrakis (heptafluoro-1-napthyl)borate and introduced into the polymerization reactor at the rate of 0.0135 g/hr. A dilute solution of triisobutyl aluminum was introduced into the reactor as a scavenger for catalyst terminators. A rate of approximately 1.11 mole of scavenger per mole of catalyst was adequate for this polymerization. After five residence times of steady polymerization, a representative sample of the copolymer produced in this polymerization was collected. The solution of the copolymer was withdrawn from the top, and then steam distilled to isolate the copolymer. The polymerization rate was measured to be about 0.26 kg/hr. The copolymer produced in this polymerization was analyzed for ethylene content by FTIR. The molecular weight averages were measured by GPC. Crystallinity was measured by DSC and the amount of mm triads of propylene residues in the copolymer chain was determined by 13 C NMR.

TABLE 2

| Commercial Product and Manufacturer. | |
|---|---|
| Commercial Product Name | Manufacturer |
| VISTALON 3666 | ExxonMobil Chemical Company |
| ICECAP K Clay | Burgess Pigment Company |
| EQUISTAR 51S07A PP | Equistar Chemical Company |
| ZnO | Zinc Corporation of America |
| SnCl$_2$ | Goldschmidt Ind. Chem. Corporation |
| SUNPAR 150 M Oil | Sunoco, Inc. |
| AMPACET 49974 | Ampacet Corporation |
| SP1045 | Phenolic Resin From Schenectady |

TABLE 3

| Test Methods. | |
|---|---|
| TEST | METHOD |
| Shore A 15 inch hardness | ISO 868 and ISO 868-85 |
| Shore D hardness | ISO 868-85 |
| Tensile strength (MPa) | ISO 37, Type S2 |
| Elongation | ISO 37-1 |
| Modulus 100% | ISO 37-1 |
| Modulus 300% | ISO 37-1 |
| Tear strength (kN/m) | ISO 34B, b |
| Compression set (%) at room temperature, 70° C., or 100° C., all at 22 hours | ISO 815 |
| Tension set (%) at 50° C., 24 hours | ISO 2285 |
| Rebound resilience button (%) (thickness = 6 mm, diameter = 28 mm) | ISO 4662 |

TABLE 4

Physical properties tested.

| | Sample | | | | | | | |
|---|---|---|---|---|---|---|---|---|
| | 1 (Comp.) | 2 | 3 | 4 (Comp.) | 5 (Comp.) | 6 (Comp.) | 7 | 8 |
| Hardness | 71 | 71 | 70 | 71 | 72 | 63 | 64 | 74 |
| Perpendicular to flow dir. | | | | | | | | |
| Tensile strength (MPa) | 8.3 | 8.9 | 8.4 | 11.5 | 8.3 | 7.2 | 6.2 | 9.4 |
| Elongation (%) | 351 | 413 | 399 | 514 | 379 | 376 | 408 | 413 |
| Mod. 100% | 3.2 | 3.1 | 3.0 | 2.9 | 3.0 | 2.5 | 2.2 | 3.3 |
| Mod. 300% | 7.0 | 6.1 | 6.1 | 5.6 | 6.4 | 5.6 | 4.6 | 6.6 |
| Tear strength (kN/m) | 20 | 24 | 24 | 30 | 23 | 22 | 21 | 25 |
| Parallel to flow direction | | | | | | | | |
| Tensile strength (MPa) | 5.8 | 6.3 | 6.1 | 7.1 | 6.1 | 5.3 | 4.9 | 6.6 |
| Elongation (%) | 165 | 236 | 237 | 329 | 222 | 214 | 249 | 228 |
| Mod. 100% | 4.6 | 4.4 | 4.2 | 4.1 | 4.3 | 3.6 | 3.3 | 4.7 |
| Mod. 300% | — | — | — | 6.6 | — | — | — | — |
| Tear strength (kN/m) | 18 | 21 | 21 | 24 | 20 | 19 | 18 | 22 |
| Compression set (%) | | | | | | | | |
| At 100° C., 22 hrs. | 28 | 34 | 34 | 45 | 29 | 30 | 34 | 32 |
| Rebound Resilience | | | | | | | | |
| Button (%) | 40.0 | 40.0 | 40.0 | — | — | — | — | 39.0 |
| Flow Marks on the injection molded plaques | Yes-A lot | None | None | None | Yes-A lot | Yes | None | None |

Example 2

The Samples of Example 1 were tested using a Bauknecht profile die attached to a 30 mm single screw extruder. The extruder had a screw length/diameter ratio of 25, and a compression ratio of 3.5 to 4. The extruder operated at a screw rate of 15 kg/hour at 100 RPMs for a run time of 6 hours. The extruder had one feeding zone which is cooed down at 60° C., four temperature zones. The Zone 1 or "feeding zone" temperature was 185° C. The Zone 2 or "transition zone" temperature was 190° C. The Zone 3 or "metering zone" temperature was 200° C. The Zone 4 temperature was 205° C. The die temperature was 205° C. Pressure change, output, and motor amperage were recorded throughout the test. Table 5 shows the pressure drop, change in output, and change of product dimensions.

TABLE 5

Bauknecht die extrusion (6 Hrs extrusion).

| Sample | Pressure Change (psi) | Output Change (kg/hr) | Dimension Change (cm) |
|---|---|---|---|
| Comparative 1 | 68 | −1 | −0.07 |
| 2 | 5 | −0.3 | −0.04 |
| 3 | 4 | 0.2 | −0.05 |
| 8 | 5 | −0.1 | 0.01 |

The profile integrity was established through evaluation of the samples for edge tearing and surface defects at specified time. Surface defects such as spots and die lines were visually inspected. The mixture without any addition of Propylene Copolymer (Comparative 1) had the greatest number of surface spots. The mixture with Propylene Coplymer D (Sample 2) had few surface spots and the mixture with Propylene Coplymer C (Sample 3) had no detectable surface spots. Further, the surface smoothness was visually inspected and was much smoother for the two mixtures that contained Propylene Coplymer D or Propylene Coplymer C.

Extrusion processing problems, such as material deposition, mustache formation and drool were also noted. None of the samples except comparative sample 1 left deposits at the die exit, and none of the samples showed edge tear based on a visual inspection of the samples.

Example 3

The Samples of Example 1 were tested using a Chicane die instead of the Bauknecht die profile. The Chican die is a special die to assess surface imperfections and die deposits. The extruder was the same as described in Example 2 except for the zone and die temperatures. The feeding zone was cooled down to 60° C. The Zone 1 temperature was 180° C. The Zone 2 temperature was 190° C. The Zone 3 temperature was 200° C. The Zone 4 temperature was 205° C. The die temperature was 215° C. Pressure change, output, and motor amperage were also recorded throughout the test. The extruder operated at a screw rate of 20 kg/hour at 140 RPMs for a run time of 2 hours. The product throughput was 0.33 kg/min.

Table 6 gives the results of testing the same three polymer mixtures in a 120 minute Chicane die extrusion for die line formation and other defects. There were no die lines with the mixture that contained the Propylene Copolymer C. There were no surface spots for either of the mixtures that contained Propylene Coplymer C or D. There were some surface spots with the mixture that contained no Propylene Coplymer (Sample 1). The surface smoothness for the mixture that contained no Propylene Coplymer was acceptable, and the surface for the mixtures containing the Propylene Coplymer components was very smooth. Also, the profile evolution for the mixtures containing the Propylene Coplymer components was better than the profile evolution than the mixture containing no Propylene Copolymer.

TABLE 6

| | Chicane die extrusion (120 minutes extrusion). | | |
|---|---|---|---|
| Sample | Die Lines After (Min.) | Surface Spots | Die deposits |
| 1 | 15 | Yes | Yes |
| 2 | 30 | None | None |
| 3 | None | None | None |

Samples in Table 7 were prepared for comparison purposes for the order of addition of the propylene copolymer.

TABLE 7

| | Bauknecht die extrusion (1 Hr extrusion) | |
|---|---|---|
| Sample | Die deposits | Extruded surface roughness |
| 3 | None | Smooth |
| Comparative 9 | Yes | Rough |

Each of the inventions have been described in greater detail above, including specific embodiments, versions and examples, but the inventions are not limited to these embodiments, versions or examples, which are included to enable a person having ordinary skill in the art to make and use the inventions, when the information in this patent is combined with available information and technology. Various terms as used herein have also been defined. To the extent a term used in a claim is not defined above, it should be given the broadest definition persons in the pertinent art have given that term as reflected in one or more printed publications or issued patents.

Certain composition features have been described using a set of numerical upper limits and a set of numerical lower limits. It should be appreciated that ranges from any lower limit to any upper limit are contemplated unless otherwise indicated. Certain lower limits, upper limits and ranges appear in one or more claims. All numerical values are "about" or "approximately" the indicated value, and take into account experimental error and variations that would be expected by a person having ordinary skill in the art. Furthermore, all patents, test procedures, and other documents cited in this application are fully incorporated by reference to the extent such disclosure is not inconsistent with this application and for all jurisdictions in which such incorporation is permitted.

We claim:

1. A process for preparing a thermoplastic vulcanizate composition having a dispersed, cross-linked rubber phase in a continuous thermoplastic polypropylene phase comprising:
   a) providing into melt processing equipment at least the following components:
      i) from 5 wt % to 10 wt %, based on the total weight of the thermoplastic vulcanizate, of at least one thermoplastic polypropylene homopolymer or copolymer having a melt temperature greater than 120° C., and a heat of fusion greater than 45 J/g;
      ii) 6-12 wt. %, based on the total weight of the thermoplastic vulcanizate composition, at least one propylene copolymer having from 7 to 30 wt. % ethylene, based upon the weight of the propylene copolymer, a melting point less than 120° C., and a heat of fusion less than 45 J/g;
      iii) from 15 wt % to 35 wt %, based on total weight of the thermoplastic vulcanizate, of at least one cross-linkable rubber, where, if including an ethylene copolymer rubber, said copolymer rubber having equal to or more than 40 wt. % the total copolymer rubber weight; and
      iv) from about 30 to 250 parts by weight, per 100 parts by weight of the rubber, of an oil;
   b) melt processing the blend of i), ii), of a);
   c) dynamically vulcanizing the cross-linkable rubber iii) in the presence of the thermoplastic i) and copolymer ii), where said step of dynamically vulcanizing is effected by employing a phenolic resin cure system at a temperature of from 180° C. to 240° C.; and where prior to said step of dynamically vulcanizing, volatiles produced by said step of melt processing b) are vented from the melt processing equipment
   d) removing a thermoplastic vulcanizate product of c) from the melt processing equipment,
   wherein the dispersed, cross-linked rubber phase of the thermoplastic vulcanizate product d) consists of particles having an effective diameter not greater than 2 millimicrons, where said thermoplastic polypropylene homopolymer or copolymer and said propylene copolymer have at least 90% of the same tacticity, further comprising the step of fabricating the thermoplastic vulcanizate, where said step of fabricating includes (i) extruding at a pressure of not greater than 10 bar for at least 6 hours under die plug free conditions or (ii) injection molding the thermoplastic vulcanizate to form a molded part that is free of flow marks.

2. The process of claim 1, wherein the polyolefinic thermoplastic resin component comprises a polypropylene homopolymer, isotactic polypropylene, an impact copolymer comprising polypropylene, or blends thereof.

3. The process of any of claims 1, wherein the dispersed rubber component is fully vulcanized.

4. A molded article comprising a thermoplastic vulcanizate composition comprising
   i) from 5 wt % to 10 wt %, based on the total weight of the thermoplastic vulcanizate, of at least one thermoplastic polypropylene homopolymer or copolymer having a melt temperature greater than 120° C., and a heat of fusion greater than 45 J/g;
   ii) 6-12 wt. %, based on the total weight of the thermoplastic ulcanizates composition, at least one propylene copolymer having from 7 to 30 wt. % ethylene, based upon the weight of the propylene copolymer, a melting point less than 120° C., and a heat of fusion less than 45J/g;
   iii) from 15 wt % to 35 wt %, based on total weight of the thermoplastic vulcanizate, of at least one cross-linkable rubber, where, if including an ethylene copolymer rubber, said copolymer rubber having equal to or more than 40 wt.% the total copolymer rubber weight; and
   iv) from about 30 to 250 parts by weight, per 100 parts by weight of the rubber, of an oil;
      wherein said thermoplastic vulcanizate composition 1) has a maximum compression set ($CS_{max}$) measured at 100° C. for 22 hours compression with 25% deformation not greater than that 12 points of a polypropylene-based TPV of the same hardness not containing a said propylene copolymer, and wherein said TPV has a distinct particulate rubber phase having a maximum diameter not exceeding 2 millimicrons when observed under an electron microscope, and wherein the molded article is free of flow marks.

5. The molded article of claim 4, wherein the polypropylene homopolymer or copolymer comprises a polypropylene homopolymer, isotactic polypropylene, an impact copolymer comprising polypropylene, or blends thereof.

6. The molded article of claim 4, wherein the rubber is an ethylene-propylene-diolefin copolymer rubber having an ethylene content equal to or greater than 40 wt. % the total copolymer rubber weight.

7. The molded article of claim 4, wherein the rubber is fully vulcanized.

8. The molded article of claim 4, wherein the thermoplastic vulcanizate has a Shore A Hardness of 90 or more.

9. The molded article of claim 4, wherein the thermoplastic vulcanizate has a tensile strength of at least 9.0 MPa measured according to ISO 37-1,Type S2.

10. The molded article of claim 4, wherein the thermoplastic vulcanizate composition has a percent elongation at break of at least 350% measured according to ISO 37-1.

11. The molded article of claim 4, where the thermoplastic vulcanizate is characterized by a compression set of less than 34% at 100 C and 22 hours.

\* \* \* \* \*